Oct. 23, 1934.     U. H. HARDESTY     1,978,046
BRAKE
Filed Nov. 17, 1932     2 Sheets-Sheet 1

INVENTOR
ULIE H. HARDESTY
BY Francis H. Vanderwerker
and Wade Koontz
ATTORNEYS

Oct. 23, 1934.  U. H. HARDESTY  1,978,046
BRAKE
Filed Nov. 17, 1932  2 Sheets-Sheet 2
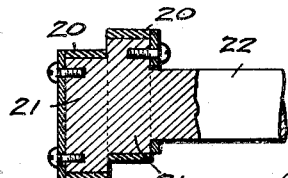
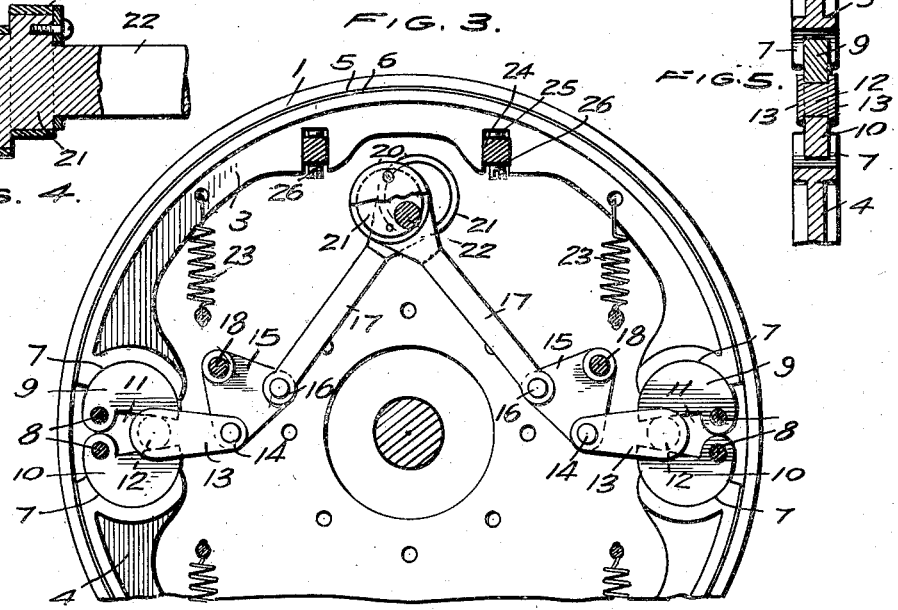
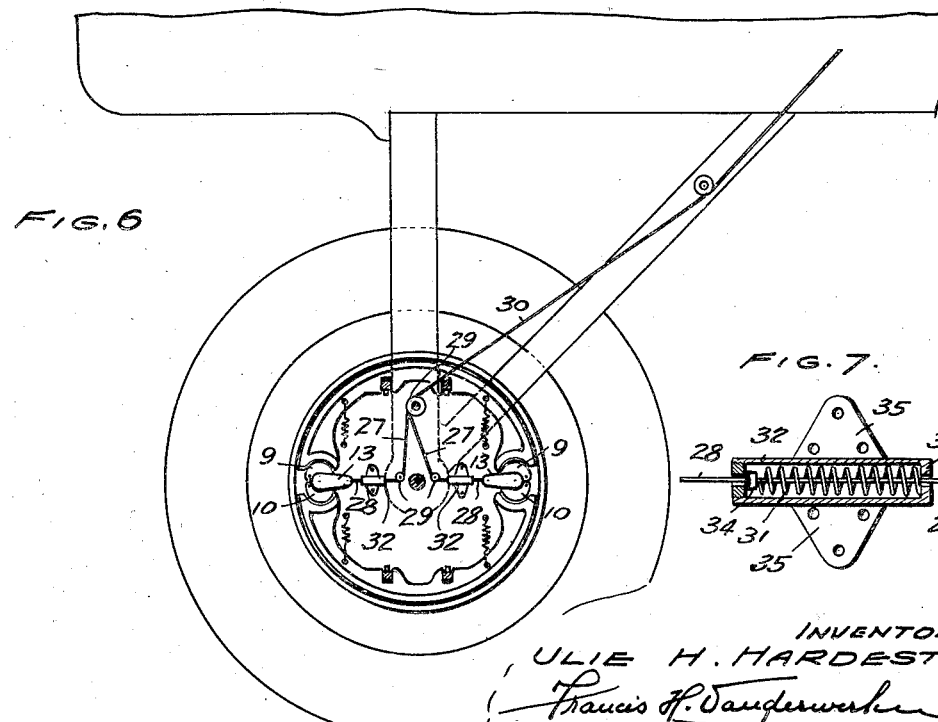
INVENTOR
ULIE H. HARDESTY
BY Francis H. Vanderwerken
and Wade Koontz
ATTORNEYS Patented Oct. 23, 1934

1,978,046

UNITED STATES PATENT OFFICE 1,978,046

BRAKE

Ulie H. Hardesty, Hempstead, N. Y.

Application November 17, 1932, Serial No. 643,089

6 Claims. (Cl. 188—78)

This invention relates to improvements in brakes for automotive vehicles and it is particularly directed to an internal brake of the expanding brake shoe type.

The object of the improvements are; first, to provide an equal distribution of braking stresses to all portions of the braking surface, thus insuring satisfactory braking action at all times and long brake life; second, to reduce and simplify the number, manufacture, and cost of brake parts; and third, to provide a brake which insures even distribution of braking power with a minimum of likelihood of jamming or locking of the brakes.

The features of the invention whereby the attainment of these objects is made possible are particularly of value in airplane brakes in the operation of which even distribution and provision against jamming are essential since jammed brakes result in wrecked airplanes.

Other objects and advantages of the invention will appear in the following detailed description of the same and in the accompanying drawings, wherein:—

Figure 3 is a side view, partly in section, of the brake assembly with the braking elements in operative braking position;

Figure 4 is a detail view, partly in section, of the internal brake shaft and eccentrics;

Figure 5 is a section on line 5—5 of Figure 1;

Figure 6 is a view of a modification of the invention, showing the device applied to the landing gear of an airplane and having a cable arrangement for operating the brake;

Figure 7 is a longitudinal sectional view of a cable guide and tensioning device.

Figure 1:
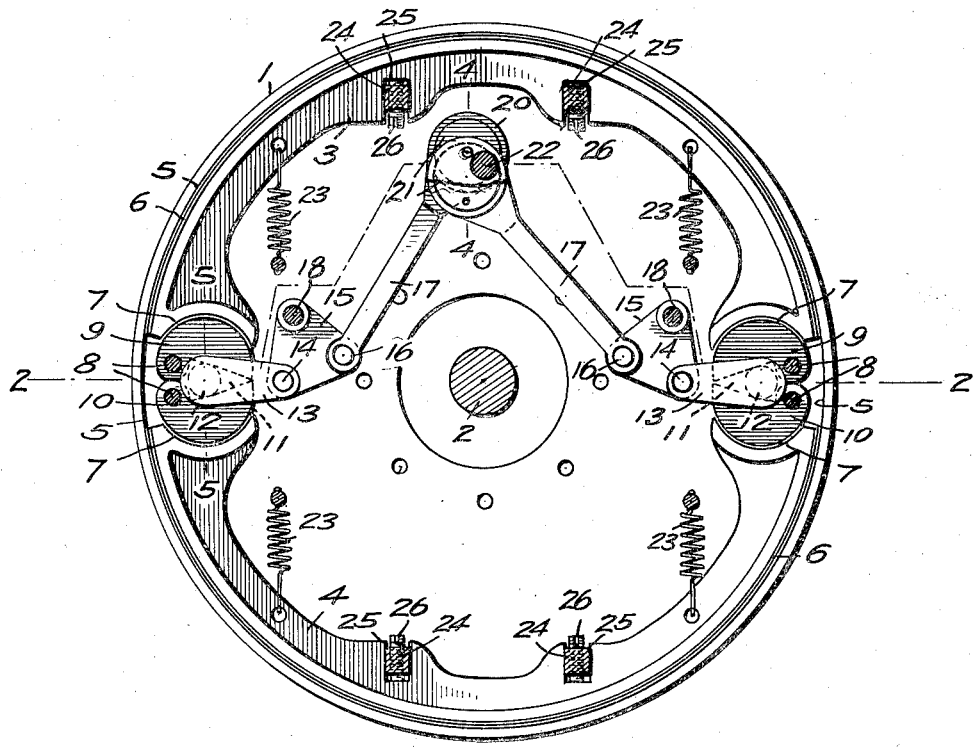
Figure 1 is a side view, partly in section, of the brake assembly with the braking elements in neutral position.
Figure 2:
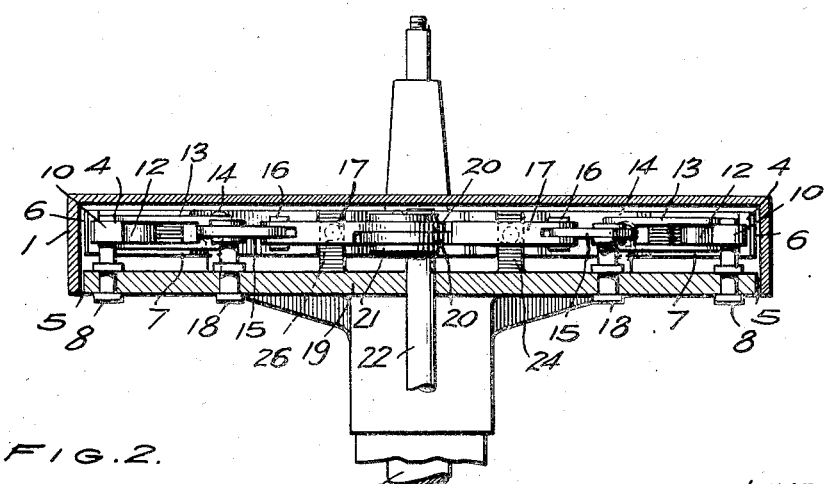
Figure 2 is a section on line 2—2 of Figure 1.

There are two kinds of brakes in general use, the external brake and the internal brake, and while the present invention is applicable to both types, it is herein described and shown with reference to its particular application to an internal brake using an expanding brake shoe. The brake shoe is usually composed of two shoe units hinged together at one end and separated at the free ends by a cam or toggle-joint action, causing the shoe to expand and tighten itself in the inner side of the brake drum. Due to the hinge or pivotal connection of the brake shoe units, all points in the brake face of each unit move in the arc of a circle during the expansion and contraction of the brake shoe with the face portions of the shoes nearest the pivot contacting earlier and with greater pressure against the brake drum than the more remote face portions of the shoes. As a result of this uneven expansion of the brake shoes, there is an unequal distribution of braking stresses with a consequent lag in the braking effect and uneven wear of the brake lining with a tendency to quickly develop brake chatter. These disadvantages are overcome or eliminated in the present invention by providing, in a brake assembly, a brake shoe or drum-engaging member having a rectilinear motion of expansion and contraction so that all points in its brake shoe surface expand equally and evenly against the brake drum to supply an equal distribution of braking stresses simultaneously to all portions of the inner brake face of the drum, with even wear of the brake lining and quicker stoppage in heavy traffic.

In the drawings, 1 designates the brake drum which is usually fixed to the wheel and revolves therewith about the axle 2. Housed within the drum is an expansible drum-engaging member which, for the purposes of this invention is composed of separate units or shoes 3 and 4 oppositely disposed for exerting a braking action on the adjacent half portions of the inner brake face 5 of the brake drum and differing essentially from the brake shoes of the conventional internal shoe type of brake in that there is no hinge or other positive connection between the shoes. Each shoe has a rectilinear motion along a diameter of the drum, rather than an angular motion as in the conventional brake assembly, during the expansion and contraction of the drum-engaging member and may be operated by air, hydraulic, or mechanical means.

In the present disclosure, the operation is by means of a novel eccentric action. The two brake shoes 3 and 4 are of semi-circular configuration, as shown, and are provided with suitable brake lining 6 of any standard composition. Each brake shoe has its ends or terminals formed, respectively, with a concave arcuate surface 7 and both shoes are spaced apart at their corresponding arcuate ends. Between each pair of spaced apart arcuate ends 7 there are mounted, on pivots 8, two segmental eccentrics 9 and 10. These segmental eccentrics 9 and 10 are so shaped that when their free extremities are in contact, one with the other as shown in Figure 1, a substantially triangular opening or wedge-shaped clearance is formed between the chords of the segmental eccentrics and inwardly of their respective pivots, as indicated at 11. Extending crosswise of each space or opening 11 as seen in Fig. 5 and in the neutral position of the parts being located at the outer or wider portion thereof, is the cylindrical spreader rod 12 of a sliding eccentric-actuating member 13. The lever-actuating members of both brake shoes are pivotally connected at 14 to individual triangular plates 15 which, in turn, are pivotally connected at 16 to pull-rods 17. Each triangular plate 15 is mounted on a pivot or fulcrum 18 carried by a stationary disk or plate 19 fixed rigidly to the axle housing 2. The pivots 8 of the several eccentrics 9 and 10 are likewise carried by the plate 19. The pull-rods 17 as shown in Fig. 4, have eccentric straps 20 at their outer ends which work freely around the rims of eccentric disks 21 keyed or otherwise fixed on the brake operating shaft 22. By means of these eccentrics, the rocking of the shaft 22 produces a reciprocating motion of the lever-actuating members 13 so that in the braking operation the members 13 are drawn inwardly toward the center of the drum, shifting the spreader rods 12 to the constricted portion of the openings 11 and thereby spreading or forcing apart the free ends of the eccentrics 9 and 10 and causing them to be oppositely rotated for exerting an outward thrust against the arcuate ends 7 of the brake shoes, as illustrated in Fig. 3. Since the thrust exerted on each shoe is applied equally to both ends of the shoe, the latter will be forced evenly against the braking surface of the drum, with all points on the brake shoe face contacting simultaneously with the braking surface. Hence, there will be an equal distribution of braking stresses to all portions of the braking surface. The brake shoes are resiliently connected to the plate 19 by springs 23 tensioned to resist the action of the brake-applying means and to return the brake shoes to neutral position after the brake is released.

To guide each brake shoe in its rectilinear movement, lugs 24 project inwardly from the plate 19 and work in guide slots or notches 25 in the central portion of the shoe. Each lug has a threaded bore in which is screwed an adjusting screw 26, the upper end of which engages the base of the slot or notch 25 and provides a rest or support for the shoe in the neutral position of the latter. Screws 26 permit adjustment of the brake shoes to vary the clearance between the brake shoe lining and the drum to compensate for wear, etc.

Figure 6 discloses an optional method of applying the brakes which does away with the use of eccentrics 17—21 and the plates 13. These elements are replaced by two cables 27, each of which is connected at one end to a rod 28, the latter being in turn connected to one of the eccentric-actuating members 13. The cables 27 pass around guide pulleys 29 suitably placed and carried by the plate 19 and at their upper ends are joined with the main pull-cable 30. Each pair of associated rods 28 and cable 27 is adequately tensioned by a compression spring 31 housed within a spring-casing 32 through which the rod and cable is guided; one end of the spring bearing against a shoulder 33 of the casing and the other end bearing against an abutment 34 on the rod 28, as shown to advantage in Figure 7. The spring housings have attaching flanges 35 by means of which they are fastened to the plate 17. An outward pull on the cables 30 and 27 draws the eccentric-actuating members 13 inwardly compressing springs 31 and at the same time causing the eccentrics 9 and 10 to be oppositely rotated for thrusting the brake shoes tightly against the brake drum. Upon release of the cables, the springs 31 expand and move the rods 28 and the eccentric-actuating members 13 outwardly, permitting the various braking elements to resume their normal or non-braking positions.

It is to be understood that the invention is not limited to the precise details of construction and arrangement of parts herein described but that various modifications and variations in the structural application of the same may be resorted to within the scope of the claims appended hereto.

I claim:

1. A brake assembly of the internal brake shoe type having, in combination, a brake drum, a pair of brake shoes within the said drum and being adjacent at their corresponding ends, a pair of pivotally mounted thrust elements between corresponding adjacent ends of the brake shoes and movable outwardly against the ends of the shoes for forcing the latter tight against the said drum, and means for actuating said thrust elements including a fixed stationary support, an operating shaft journaled in said support, a triangular plate pivoted to said support, an eccentric connecting the said triangular plate and the said operating shaft, a spreader between paired thrust elements and movable therebetween to force the thrust elements apart, and a pivotal connection between the said spreader and the said triangular plate.

2. A wheel brake having, in combination, a rotatable brake drum, a stationary plate, a pair of slidable brake shoes carried by said plate and having opposed ends spaced slightly apart, eccentrically pivoted thrust elements secured to said stationary plate within the spaces between the opposed ends of the shoes, said thrust elements having relatively inclined surfaces, and means movable between said inclined surfaces for rotating said eccentrically pivoted thrust elements in opposite directions and outwardly in thrusting relation with the opposed ends of the brake shoes.

3. A wheel brake comprising a revoluble brake drum, a stationary plate, a pair of brake shoes slidably supported by said plate and having opposed ends, eccentrically pivoted and segmental shaped thrust elements carried by the plate and arranged one above the other in pairs between the opposed ends of the brake shoes, the elements of each pair normally converging at corresponding free ends to provide a triangularly shaped opening between the chords of the respectively paired segments, spreaders movable longitudinally between the converging ends of paired cam levers to rotate the latter oppositely and outwardly in thrusting relation with the ends of the brake shoes to thrust the shoes against the said drum, and means for moving the said spreaders.

4. A wheel brake having, in combination, a rotatable brake drum, a stationary plate, a pair of oppositely disposed brake shoes having opposed ends slightly spaced apart and being slidable on the said plate, tension means normally holding the said shoes yieldably retracted from the said drum, a pair of thrust elements pivotally mounted on the said plate between each set of opposed ends, the elements of each pair being rotatable about an eccentric axis and each pair of thrust elements having relatively spaced inclined and converging surfaces, a spreader movable between the converging surfaces to rotate the thrust elements oppositely outward and against adjacent ends of the brake shoes to move the latter into frictional engagement with the said drum and means for moving the spreaders.

5. A wheel brake having, in combination, a rotatable brake drum, a stationary plate, a pair of brake shoes carried by said plate and having opposed ends spaced slightly apart, a pair of rotatable thrust elements pivotally mounted on said plate between opposed ends of the shoes, said thrust elements and said ends having contacting curved bearing surfaces, the curved bearing surfaces of the thrust elements being concentric with the curved bearing surfaces of the shoes but the thrust elements themselves being eccentrically pivoted, and means for rotating said thrust elements about their pivots.

6. A wheel brake having, in combination, a rotatable brake drum, a stationary plate, a pair of brake shoes carried by said plate and having opposed ends, a pair of eccentrically rotatable thrust elements pivoted to the said plate between the opposed ends of the brake shoes and having oppositely disposed and relatively converging portions angularly approaching each other at their free ends, spreader rods shiftable between the free ends of the thrust elements for oppositely rotating the latter to impart a thrust outwardly against the ends of the brake shoes, and an operating cable connected with said spreader rods for shifting the latter.

ULIE H. HARDESTY.